US010824816B2

(12) United States Patent
Zang et al.

(10) Patent No.: US 10,824,816 B2
(45) Date of Patent: Nov. 3, 2020

(54) SEMANTIC PARSING METHOD AND APPARATUS

(71) Applicants: Beijing Jingdong Shangke Information Technology Co., Ltd., Beijing (CN); Beijing Jingdong Century Trading Co., Ltd., Beijing (CN)

(72) Inventors: Xi Zang, Beijing (CN); Xin Zhou, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 155 days.

(21) Appl. No.: 16/303,000

(22) PCT Filed: Apr. 20, 2017

(86) PCT No.: PCT/CN2017/081197
§ 371 (c)(1),
(2) Date: Nov. 19, 2018

(87) PCT Pub. No.: WO2017/198031
PCT Pub. Date: Nov. 23, 2017

(65) Prior Publication Data
US 2019/0171713 A1 Jun. 6, 2019

(30) Foreign Application Priority Data
May 19, 2016 (CN) .......................... 2016 1 0338834

(51) Int. Cl.
*G06F 40/30* (2020.01)
*G06F 16/00* (2019.01)
(Continued)

(52) U.S. Cl.
CPC .............. *G06F 40/30* (2020.01); *G06F 16/00* (2019.01); *G06F 16/243* (2019.01); *G06F 40/205* (2020.01); *G06F 40/211* (2020.01)

(58) Field of Classification Search
CPC .. G06F 17/279; G06F 17/30451; G06F 17/30; G06F 17/30663; G06F 17/30401; G06F 17/30867
See application file for complete search history.

(56) References Cited

U.S. PATENT DOCUMENTS 5,819,258 A * 10/1998 Vaithyanathan ...... G06F 16/355
                                                          707/692
6,523,026 B1 * 2/2003 Gillis .................. G06F 16/3332
(Continued)

FOREIGN PATENT DOCUMENTS

CN       104615755 A     5/2015
CN       104657463 A     5/2015
(Continued)

OTHER PUBLICATIONS

International Search Report dated Jun. 30, 2017 which issued on International Patent Application No. PCT/CN2017/081197 (2 pages).

*Primary Examiner* — Anne L Thomas-Homescu
(74) *Attorney, Agent, or Firm* — Nixon Peabody LLP

(57) ABSTRACT

A semantic parsing method and a semantic parsing apparatus. The method includes: receiving semantic information; parsing the semantic information to obtain a primary text feature; calculating a similarity degree between the primary text feature and a linguistic data feature; using a linguistic data to which a linguistic data feature most similar to the primary text feature belongs, as a primary parsing text; extracting a feature of the primary parsing text to obtain a secondary text feature; obtaining a service feature matching the secondary text feature; obtaining a weight value associated with the obtained service feature; using a service field (Continued)

to which a service feature having a greatest weight value belongs, as the service field to which the primary parsing text belongs; and parsing the primary parsing text in the service field to which the primary parsing text belongs, to obtain a secondary parsing text.

11 Claims, 5 Drawing Sheets

(51) Int. Cl.
*G06F 40/205* (2020.01)
*G06F 40/211* (2020.01)
*G06F 16/242* (2019.01)

(56) References Cited

U.S. PATENT DOCUMENTS

| | | | | |
|---|---|---|---|---|
| 8,577,671 | B1* | 11/2013 | Barve | G06F 16/2457 |
| | | | | 704/9 |
| 9,519,636 | B2* | 12/2016 | Cras | G06F 16/252 |
| 9,747,390 | B2* | 8/2017 | Cooper | G06F 40/30 |
| 10,169,456 | B2* | 1/2019 | Chakra | G06F 16/951 |
| 10,332,508 | B1* | 6/2019 | Hoffmeister | G06N 20/10 |
| 10,388,274 | B1* | 8/2019 | Hoffmeister | G06N 3/0445 |
| 10,489,393 | B1* | 11/2019 | Mittal | G10L 15/265 |
| 2002/0129015 | A1* | 9/2002 | Caudill | G06F 16/353 |
| 2003/0037073 | A1* | 2/2003 | Tokuda | G06F 16/355 |
| | | | | 715/234 |
| 2003/0066025 | A1* | 4/2003 | Garner | G06F 16/3329 |
| | | | | 715/256 |
| 2009/0282019 | A1* | 11/2009 | Galitsky | G06F 40/279 |
| 2010/0228693 | A1* | 9/2010 | Dawson | G06F 16/322 |
| | | | | 706/12 |
| 2011/0225159 | A1* | 9/2011 | Murray | G06F 16/358 |
| | | | | 707/739 |
| 2012/0078062 | A1* | 3/2012 | Bagchi | G16H 10/60 |
| | | | | 600/300 |
| 2013/0246046 | A1* | 9/2013 | Fan | G06F 40/30 |
| | | | | 704/9 |
| 2014/0006012 | A1* | 1/2014 | Zhou | G06F 16/3344 |
| | | | | 704/9 |
| 2014/0108453 | A1* | 4/2014 | Venkataraman | G06F 16/9535 |
| | | | | 707/774 |
| 2015/0026106 | A1* | 1/2015 | Oh | G06F 16/3347 |
| | | | | 706/12 |
| 2015/0074112 | A1* | 3/2015 | Liu | G06F 16/43 |
| | | | | 707/739 |
| 2015/0161134 | A1* | 6/2015 | Balani | G06F 16/2425 |
| | | | | 707/731 |
| 2015/0370782 | A1* | 12/2015 | Fan | G06F 40/211 |
| | | | | 704/9 |
| 2016/0092448 | A1* | 3/2016 | Byron | G06F 16/3344 |
| | | | | 707/739 |
| 2016/0179945 | A1* | 6/2016 | Lastra Diaz | G06F 16/3334 |
| | | | | 707/739 |
| 2016/0196491 | A1* | 7/2016 | Chandrasekaran | G06F 40/40 |
| | | | | 706/50 |
| 2016/0196820 | A1* | 7/2016 | Williams | G10L 15/18 |
| | | | | 704/244 |
| 2016/0203120 | A1* | 7/2016 | Boguraev | G06F 40/284 |
| | | | | 704/9 |
| 2016/0232155 | A1* | 8/2016 | Allen | G06Q 10/06316 |
| 2016/0373456 | A1* | 12/2016 | Vermeulen | G06F 16/245 |
| 2017/0039275 | A1* | 2/2017 | Akolkar | G06F 16/345 |
| 2017/0221072 | A1* | 8/2017 | AthuluruTlrumala | |
| | | | | G06F 3/0482 |
| 2017/0228367 | A1* | 8/2017 | Pasupalak | G06F 40/20 |
| 2017/0235820 | A1* | 8/2017 | Conrad | G06F 16/358 |
| | | | | 707/728 |
| 2017/0235885 | A1* | 8/2017 | Cox | G06F 40/284 |
| | | | | 705/2 |
| 2017/0255702 | A1* | 9/2017 | Liu | G06N 5/048 |
| 2017/0262529 | A1* | 9/2017 | Chim | G06F 16/951 |
| 2017/0329764 | A1* | 11/2017 | Beller | G06F 16/9535 |
| 2017/0329820 | A1* | 11/2017 | Park | G06F 16/24522 |
| 2018/0075131 | A1* | 3/2018 | Van Hoof | G06F 16/3344 |
| 2018/0075251 | A1* | 3/2018 | Van Hoof | G06F 21/6227 |
| 2018/0089681 | A1* | 3/2018 | Fenimore | G06F 16/23 |
| 2018/0268253 | A1* | 9/2018 | Hoffman | G06K 9/00483 |
| 2018/0349362 | A1* | 12/2018 | Sharp | G06F 16/14 |
| 2020/0012638 | A1* | 1/2020 | Luo | G06F 16/24522 |

FOREIGN PATENT DOCUMENTS

| | | |
|---|---|---|
| CN | 104699708 A | 6/2015 |
| CN | 105354300 A | 2/2016 |

* cited by examiner

SEMANTIC PARSING METHOD AND APPARATUS

CROSS-REFERENCE TO RELATED APPLICATIONS

This application is a U.S. National Stage of International Application No. PCT/CN2017/081197, filed on Apr. 20, 2017, which claims priority to Chinese Patent Application No. 201610338834.2 filed with the State Intellectual Property Office of China (SIPO) on May 19, 2016. All of the aforementioned applications are, hereby incorporated by reference in their respective entireties.

TECHNICAL FIELD

The present disclosure relate to the field of computer technology, specifically to the field of Internet technology, and more specifically to a method and apparatus for parsing semantics.

BACKGROUND

In recent years, as an important direction in the field of science and artificial intelligence, the natural language processing technology develops rapidly, leading to the development of theoretical research and application of intelligent robots. More and more e-commerce websites or service fields involving consulting services start to apply this technology to replace the traditional manual service.

At present, the application of intelligent robot technology in Internet products is relatively concentrated, such as: banking service consulting, e-commerce pre-sales and after-sales service Q&A. In these services, the method for parsing semantics by the robots generally includes: first, organizing service knowledge manually, classifying the service knowledge, allocating questions and answers, and then "teaching" the robots under the human "supervision", and finally replacing human with the robots to provide the services.

However, in the case where there are many service points of a certain service, the above method for parsing user semantics by the robots can only parse the general intention of the user semantics, and the accuracy of parsing the semantics is low.

SUMMARY

The objective of the present disclosure includes providing an improved method and apparatus for parsing semantics, to solve the technical problems mentioned in the Background section.

In a first aspect, the present disclosure provides a method for parsing semantics. The method includes: receiving semantic information inputted by a user; parsing the semantic information to obtain a primary text feature of an associated service; calculating a similarity degree between the primary text feature and a linguistic data feature in a corpus; using a linguistic data to which a linguistic data feature most similar to the primary text feature belongs, as a primary parsing text; extracting a feature of the primary parsing text to obtain a secondary text feature; obtaining a service feature matching the secondary text feature in a service feature database and a service field to which the obtained service feature belongs; obtaining a weight value associated with the obtained service feature in a service feature weight database; using a service field to which a service feature having a greatest weight value belongs, as a service field to which the primary parsing text belongs; and parsing the primary parsing text in the service field to which the primary parsing text belongs, to obtain a secondary parsing text.

In a second aspect, the present disclosure provides an apparatus for parsing semantics. The apparatus includes: a semantic receiving unit, configured to receive semantic information inputted by a user; a primary parsing unit, configured to parse the semantic information to obtain a primary text feature of an associated service; a similarity degree calculation unit, configured to calculate a similarity degree between the primary text feature and a linguistic data feature in a corpus; a linguistic data determination unit, configured to use a linguistic data to which a linguistic data feature most similar to the primary text feature belongs, as a primary parsing text; a feature extraction unit, configured to extract a feature of the primary parsing text to obtain a secondary text feature; a feature obtaining unit, configured to obtain a service feature matching the secondary text feature in a service feature database and a service field to which the obtained service feature belongs; a weight obtaining unit, configured to obtain a weight value associated with the obtained service feature in a service feature weight database; a field determination unit, configured to use a service field to which a service feature having a greatest weight value belongs, as a service field to which the primary parsing text belongs; and a secondary parsing unit, configured to parse the primary parsing text in the service field to which the primary parsing text belongs, to obtain a secondary parsing text.

By extracting the text feature of the associated service for the semantic information inputted by a user to obtain the primary text feature, then calculating the similarity degree between the primary text feature and the linguistic data feature in the corpus, using the linguistic data to which the linguistic data feature most similar to the primary text feature belongs, as the primary parsing text, extracting the feature of the primary parsing text to obtain a secondary text feature, obtaining the service feature matching the secondary text feature in a service feature database and the service field to which the obtained service feature belongs, obtaining the weight value associated with the obtained service feature in a service feature weight database, using the service field to which the service feature having the greatest weight value belongs, as the service field to which the primary parsing text belongs, and then parsing the primary parsing text in the service field to which the primary parsing text belongs, to obtain a secondary parsing text, the method and apparatus for parsing semantics provided by the present disclosure improve the accuracy of the semantic parsing result.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
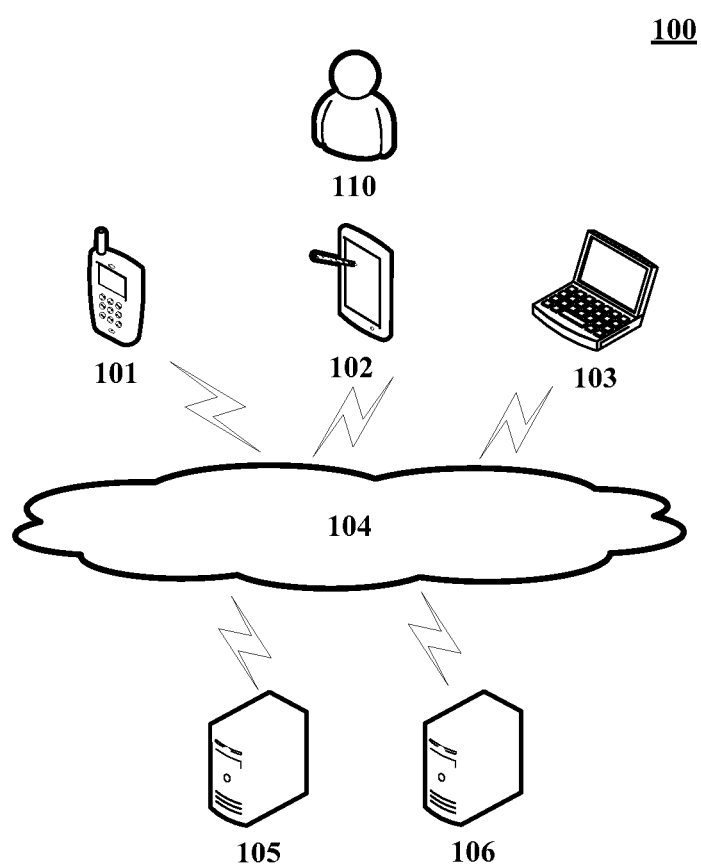
FIG. 1 is an exemplary system architecture diagram to which the present disclosure may be applied.

FIG. 1 shows an exemplary system architecture 100 in which a method for parsing semantics or an apparatus for parsing semantics according to the embodiments of the present disclosure.

As shown in FIG. 1, the system architecture 100 may include terminal devices 101, 102 and 103, a network 104 and servers 105 and 106. The network 104 serves as a medium providing a communication link between the terminal devices 101, 102 and 103 and the servers 105 and 106. The network 104 may include various types of connections, such as wired or wireless transmission links, or optical fibers.

The user 110 may use the terminal devices 101, 102 and 103 to interact with the servers 105 and 106 through the network 104, in order to transmit or receive messages, etc. Various communication client applications, such as webpage browser applications, shopping applications, search applications, instant messaging tools, mailbox clients, and social platform software may be installed on the terminal devices 101, 102 and 103.

The terminal devices 101, 102 and 103 may be various electronic devices having screens and supporting inputting semantic information by a user, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be servers providing various services, for example, a backend server parsing semantic information inputted by the user through the terminal devices 101, 102 or 103 and providing answer information. The backend server may perform a processing such as an analysis on data such as the semantic information inputted by the user, and return a processing result (for example, an answer) to the terminal devices.

It should be noted that the method for parsing semantics according to the embodiments of the present disclosure is generally executed by the servers 105 and 106. Accordingly, the apparatus for parsing semantics is generally installed on the servers 105 and 106.

It should be appreciated that the numbers of the terminal devices, the networks and the servers in FIG. 1 are merely illustrative. Any number of terminal devices, networks and servers may be provided based on the actual requirements.

Figure 2:
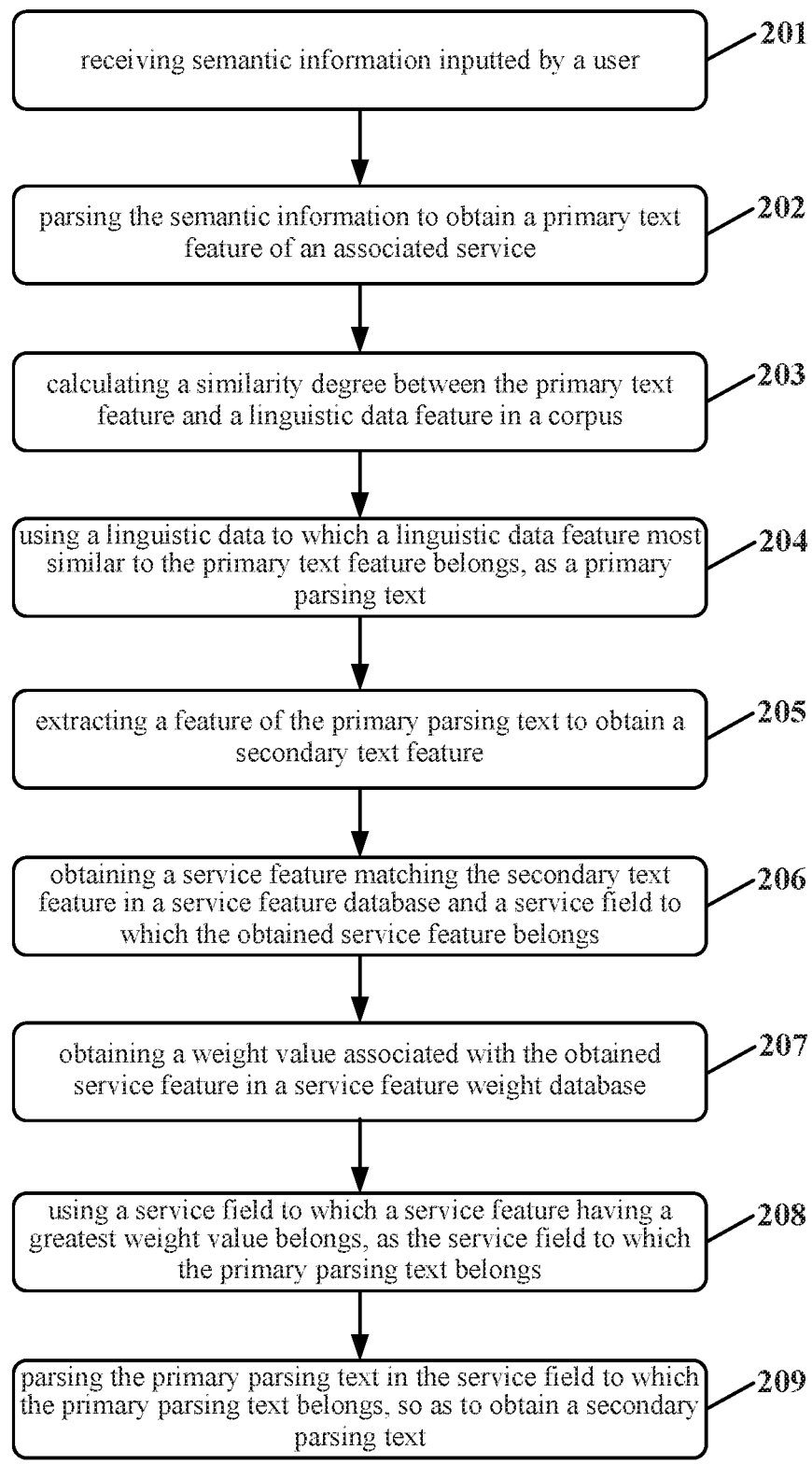
FIG. 2 is a flowchart of an embodiment of a method for parsing semantics according to the present disclosure.

With further reference to FIG. 2, a flow 200 of an embodiment of a method for parsing semantics according to the present disclosure is illustrated. The method for parsing semantics includes the following steps.

Step 201 includes receiving semantic information inputted by a user.

In the present embodiment, the electronic device (e.g., the server as shown in FIG. 1) on which the method for parsing semantics is performed may receive semantic information from a terminal with which the user makes input through a wired connection or a wireless connection. It should be noted that the wireless connection may include, but not limited to, 3G/4G connection, WiFi connection, Bluetooth connection, WiMAX connection, Zigbee connection, UWB (ultra wideband) connection, and other wireless connections known by now or to be developed in the future.

Generally, the user browses webpages by using applications installed on the terminal such as a web browser application, a shopping application, a search application, and an instant messenger. In this case, the user may use one or more types of voice information, text information, and lip moving information to enter the semantic information. In the present embodiment, the semantic information may include the text format, the audio format, the picture format, or other semantic information of a format to be developed in the future.

Step 202 includes parsing the semantic information to obtain a primary text feature of an associated service.

In the present embodiment, based on the semantic information received in step 201, the semantic information may be parsed to obtain the primary text feature of the associated service. Here, if the semantic information is text information, features of the text information may be directly extracted, and the primary text feature of the associated service may be screened out from the extracted features; if the semantic information is voice information and/or lip moving information, the voice information and/or the lip moving information need to be first parsed to obtain corresponding text information, then feature extraction is performed on the text information, and the primary text feature of the associated service is screened out from the extracted features.

Here, the statistic-based feature extraction method in the existing technology or technologies developed in the further may be employed to extract the features of the text information. For example, the word frequency-inverse document frequency, the word frequency method, the document frequency method, and the like may be used to extract the features of the text information. These statistic-based feature extraction methods may evaluate each feature in the feature set by constructing an evaluation function, and score each feature, so that each word obtains an evaluation value, also known as a weight value. All features are then arranged in an order of weight values, and a predetermined number of optimal features are extracted as a feature subset of the extraction result.

In some alternative implementations of the present embodiment, the parsing the semantic information to obtain a primary text feature of an associated service may include: first obtaining text information of the semantic information; then performing cleaning and dimensionality reduction on the text information; then performing semantic and syntactic analysis on the cleaned and dimensionality-reduced text information to obtain a text information feature, and finally extracting a feature of the associated service in the text information feature to obtain the primary text feature.

Here, performing cleaning on the text information refers to the last procedure for finding and correcting identifiable errors in data files, including checking data consistency, processing invalid values and missing values. The task of data cleaning is to filter data that does not meet the requirements. The data that does not meet the requirements are mainly three types: incomplete data, erroneous data, and duplicate data. For example, the cleaning includes converting Chinese and English symbols in the text information, converting simplified and traditional Chinese characters, and cleaning duplicate data, conflicting data, and meaningless characters, etc. Here, meaningless characters refer to features that do not influence classification, such as "hello", "excuse me" and naughty words. Performing dimensionality reduction on the text information is to map sample points from the input space to a low-dimensional space through linear or nonlinear transformation, thereby obtaining a compact and low-dimensional representation of the original data set. For example, the following methods are used to reduce the dimensionality of the text information: the missing value ratio method, high correlation filtering method, principal component analysis method, and the like.

Here, performing semantic and syntactic analysis on the cleaned and dimensionality-reduced text information may obtain a text information feature marking multiple dimensions. The syntactic analysis here refers to the analysis of various grammatical relationships between words and words in the syntactic structure: subject-predicate, predicate-complement, predicate-object, subordinate, union, and the like. The semantic relationship here refers to the relationship between objective objects represented by linguistic components in semantics. The semantic relationship refers to the relationship between actions and actors, actions and action receivers, actions and tools, actions and places, things and things, etc. In the semantic and syntactic analysis, a pre-established word segmentation model may be used to complete the analysis. Dada for training the segmentation model may be historical question and answer data containing service knowledge, or manually added data.

Here, the extracting a feature of the associated service in the text information feature refers to discarding a part of text feature words without service features and improving weights of the other part of text feature words, on the basis of the text information feature.

Step 203 includes calculating a similarity degree between the primary text feature and a linguistic data feature in a corpus.

In the present embodiment, the corpus refers to a collection of text manually marked in advance or text converted from speech, which may be used for language analysis and language description. The corpus may also be considered as a finite collection of machine-readable text, representing a language or language variant to the greatest extent. By calculating the similarity degree between the primary text feature and the linguistic data feature in the corpus, the linguistic data to which the linguistic data feature most similar to the primary text feature belongs, i.e., the primary parsing text, may be determined.

Step 204 includes using a linguistic data to which a linguistic data feature most similar to the primary text feature belongs, as a primary parsing text.

In the present embodiment, based on the similarity degree between the primary text feature and the linguistic data feature in the corpus calculated in step 203, the linguistic data to which the linguistic data feature similar to the primary text feature belongs may be selected, and the selected linguistic data is used as the primary parsing text.

Step 205 includes extracting a feature of the primary parsing text to obtain a secondary text feature.

In the present embodiment, based on the primary parsing text obtained in step 204, the feature of the primary parsing text may be extracted, and the extracted feature of the primary parsing text is used as the secondary text feature.

Here, the method for extracting the feature of the primary parsing text may be the same as or different from the method for extracting the text feature described above, and the statistic-based feature extraction method in the existing technology or the future developed technologies may be used to extract the feature of the primary parsing text. For example, the word frequency-inverse document frequency, the word frequency method, the document frequency method, and the like may be used to extract the feature of the primary parsing text. These statistic-based feature extraction methods may evaluate each feature in the feature set by constructing an evaluation function, and score each feature, so that each word obtains an evaluation value, also known as a weight value. All features are then arranged in an order of weight values, and a predetermined number of optimal features are extracted as a feature subset of the extraction result.

In some alternative implementations of the present embodiment, the extracting a feature of the primary parsing text to obtain a secondary text feature may include: first obtaining the primary parsing text; then performing cleaning and dimensionality reduction on the primary parsing text; and performing semantic and syntactic analysis on the cleaned and dimensionality-reduced primary parsing text to obtain the secondary text feature.

Here, the cleaning and dimensionality reduction are the same as the above method of performing cleaning and dimensionality reduction on the text information, and detailed description thereof will be omitted.

Step 206 includes obtaining a service feature matching the secondary text feature in a service feature database and a service field to which the obtained service feature belongs.

In the present embodiment, the service feature database includes service features extracted from user questions in advance and the service fields to which the features belong. Based on the secondary text feature obtained in step 205, the service feature matching the secondary text feature may be obtained in the service feature database, and the service field to which the service feature belongs is obtained. It should be understood that there may be one or more service features of the service field in the service feature database that match the secondary text feature.

In some alternative implementations of the present embodiment, in order to obtain a simplified service feature, after the matching of the secondary text feature and the features in the service feature database, an anaphora resolution may be performed on the obtained service feature, that is, the obtaining a service feature matching the secondary text feature in a service feature database may include: first obtaining the service feature matching the secondary text feature in the service feature database; then performing an anaphora resolution on the service feature matching the secondary text feature to obtain an anaphora-resolved service feature; and finally determining the anaphora-resolved service feature as the obtained service feature.

Here, rules of the anaphora resolution may include the following cases.

In a first case, the service features includes pronouns, such as: "this", "this one", "the present", "the present one", and the pronouns modify nouns, gerunds, pronouns are resolved; in a second case, the service words are nouns, or gerunds, and there are adjectives and gerunds in front of the services words, then the adjectives and gerunds are resolved; in a third case, the service words are nouns or gerunds, and there are verbs in front of and behind the service words, then the verbs in front are resolved; in a fourth case, the service words are verbs, and the sentence contains only one noun and one verb, then words of other part of speeches are resolved, for example, "whether a system/n adapts/v (service word) well" is resolved to "system adapts"; in a fifth case, the service words are nouns, and there is only one noun in the sentence, then words of other part of speeches are resolved, for example, "what is this size/n (service word)" is resolved to "size"; and in a sixth case, the service words are adjectives, if there are service words in front of and behind the service word, the weights are compared, and service words with greater weights are kepted.

In some alternative implementations of the present embodiment, the method for parsing semantics further includes: obtaining and determining a service feature in a service feature database and a service field to which the service feature belongs by the following steps: obtaining a sample of service information in a marked service field; performing a word segmentation on the sample based on statistic and machine learning and determining a part of speech of the segmented word; and determining the service feature in the service feature database and the service field to which the service feature belongs, according to a frequency of occurrence and the part of speech of the segmented word. For example, in a model in which the service field is the size, the texts are "what/a is/v goods/n's/uj size/n" and "what/a is/v goods/n's/uj thickness/n", here, n is a noun, nj is a structural auxiliary, v is a verb, and a is an adjective, so the "size" and "thickness" here are service features. Then, the affiliation between the service words, such as {thickness}∈{size}, is analyzed, so that the service field to which the service features belongs is size.

Step 207 includes obtaining a weight value associated with the obtained service feature in a service feature weight database.

In the present embodiment, corresponding to obtaining one service feature in step 206, the weight corresponding to the service feature may be obtained in the service feature weight database, and corresponding to obtaining multiple service features in step 206, a respective weight of each of the service features may be obtained from the service feature weight database.

The weight database here includes a weight preset in advance based on the service feature and the service field to which the service feature belongs. When presetting the weight, it is typically considered to give higher weights to those service features that can express the subject. When assigning weights to the service features, factors such as the word frequency, part of speech, word length, location, and synonym phenomenon may be fully considered. For example, words with the same or similar meaning are treated as one word, and their word frequencies are added together; a noun or a combined word containing a noun is given a high weight; and a word having 4 or more words is given a high weight.

In some alternative implementations of the present embodiment, the method for parsing semantics further includes: setting a weight of the service feature in the service feature weight database, according to a granularity of the service feature and a preset corresponding relationship between the granularity and the weight.

The granularity here refers to the refinement and comprehensiveness of the service feature. For example, according to the division criterion of the service feature, the weights in the service feature weight database may be divided into three levels: detailed data, mild summary, and high summary. One principle of determining the granularity of data should be noted: the higher the degree of refinement is, the smaller the granularity is; and the lower the degree of refinement is, the larger the granularity is.

After determining the granularity of the service feature, the weight of the service feature in the service feature weight database may be set according to the preset corresponding relationship between the granularity and the weight.

Step 208 includes using a service field to which a service feature having a greatest weight value belongs, as the service field to which the primary parsing text belongs.

In the present embodiment, if the weight of the service feature obtained in step 207 is a single weight, the service field to which the service feature belongs is used as the service field to which the primary parsing text belongs; and if multiple weights of the service feature are obtained in step 207, then the multiple weights are arranged in a descending order, and the service field to which the service feature corresponding to the first weight belongs is selected as the service field to which the primary parsing text belongs, thereby more accurately determining the field to which the user intention belongs.

Step 209 includes parsing the primary parsing text in the service field to which the primary parsing text belongs, so as to obtain a secondary parsing text.

In the present embodiment, based on the service field to which the primary parsing text belongs obtained in step 208, a statistic-based word segmentation is performed on the primary parsing text, and then the segmented word is compared with the feature in the service field to which the primary parsing text belongs to obtain a secondary parsing text in the service field to which the primary parsing text belongs.

In some alternative implementations of the present embodiment, after obtaining the secondary parsing text, the answer to the secondary parsing text may also be obtained based on the secondary parsing text: first, determining an answer subset corresponding to the service field in an answer set according to the service field to which the primary parsing text belongs, then querying the question corresponding to the secondary parsing text in the answer subset, and then obtaining the answer corresponding to the question and using the answer as the answer corresponding to the secondary parsing text, that is, the method for parsing semantics further includes: querying an answer corresponding to the secondary parsing text in an answer set corresponding to the service field to which the primary parsing text belongs; and presenting the answer corresponding to the secondary parsing text.

It should be understood that the answer set here may generally include a predetermined Q&A (question and answer) with a field mark, the Q&A including the question and the answer corresponding to question, the Q&A may come from common questions on the official website and answers corresponding thereto, may come from the Q&As selected from the chat records of the manual customer service, or may be the Q&As written manually according to the questions.

Figure 3:
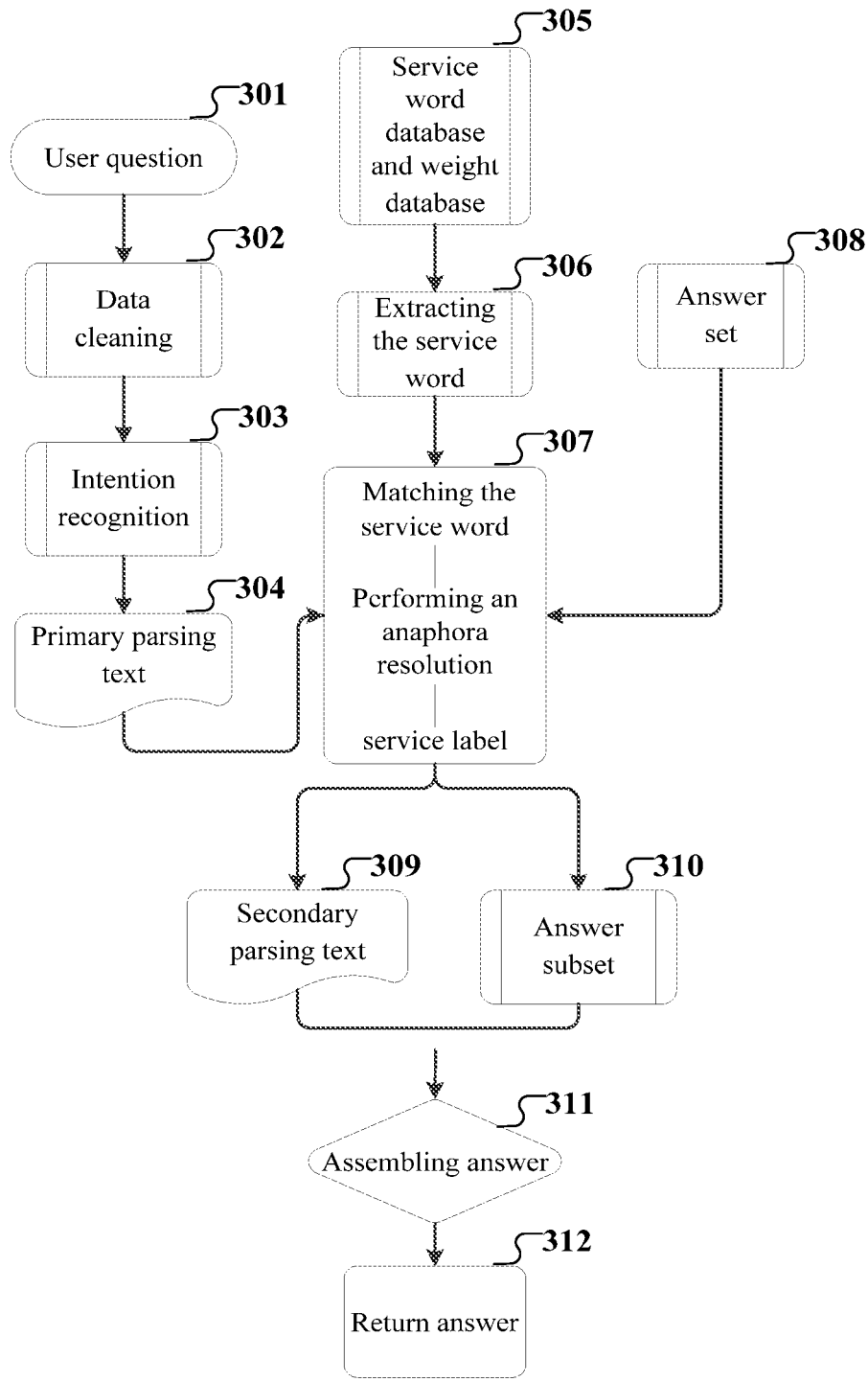
FIG. 3 is a schematic flowchart of an application scenario of the method for parsing semantics according to the present disclosure.

With further reference to FIG. 3, FIG. 3 is a schematic flowchart of an application scenario of the method for parsing semantics according to the present embodiment.

As shown in FIG. 3, the method for parsing semantics includes the following steps.

Step 301 includes receiving a user question, and then proceeding to step 302.

Step 302 includes performing data cleaning and dimensionality reduction of text information of the received user question, and then proceeding to step 303.

Step 303 includes performing an intention recognition on the cleaned and dimensionality-reduced text information, including: performing semantic and syntactic analysis on the cleaned and dimensionality-reduced text information to obtain a text information feature, and extracting a feature of the associated service in the text information to obtain the primary text feature, and then calculating the similarity degree between the primary text feature and a linguistic data feature in a corpus, and using a linguistic data to which a linguistic data feature most similar to the primary text feature belongs, as the result of the intention recognition, and then proceeding to step 307.

Step 304 includes using the result of the intention recognition as the primary parsing text.

Step 305 includes offline calculating a service feature database including service features and service fields and a service feature weight database including service features and weights;

Step 306 includes extracting the service features and the weights of the service features from the service feature database;

Step 307 includes performing a statistic-based word segmentation on the primary parsing text, and then matching the segmented word with the extracted service feature, if matched, recording the position of the segmented word, and searching and determining whether the segmented word is consistent with the part of speech of the preceding and adjacent segmented word or is resolvable, for example, the parts of speech are pronouns, adjectives, or gerunds, if yes, then, merging the words from the position of the word to the end of the search into one phrase, resolving the phrase into a key service word, and attaching a corresponding weight; and when resolving to the end of the text, re-merging the resolved text, determining the service field to which the service feature having the greatest weight value belongs as the service field to which the primary parsing text belongs, and marking the service field for the merged text, and then proceeding to steps 309 and 310.

Step 308 includes predetermining an answer set, the answer set including a Q&A with a field mark.

Step 309 includes reparsing the primary parsing text in the service field marked for the merged text to obtain a secondary parsing text, and then proceeding to step 311.

Step 310 includes extracting an answer subset meeting the service field marked for the merged text from the answer set determined in step 308, and then proceeding to step 311.

Step 311 includes querying an answer feature corresponding to the feature of the secondary parsing text from the answer subset, and assembling the answer feature into an answer, and then proceeding to step 312.

Step 312 includes returning the assembled answer.

In an application scenario corresponding to the above flowchart of FIG. 3, first, a user input "Hello, can this red pomegranate wash-free sleep mask improve a dark yellow skin type?" is received. By the data cleaning, dimensionality reduction, and matching with the corpus, the input becomes a primary parsing text "This red pomegranate wash-free sleep mask can improve a dark yellow skin type?" Then, word segmentation is performed, and service words are located respectively, which are: "mask {w=0.48}", "dark yellow {w=0.80} and "skin type {w=0.6}". Here, "red" is an adjective, modifying "pomegranate", then "red pomegranate" is merged, the pronoun "this" is in front, and then resolve "this red pomegranate" as "red pomegranate". The service word "mask" has verbs (wash-free, sleep) and the noun (red pomegranate) in front, then the words are resolved into "mask". The adjective "dark yellow" modifies "skin type" Since the service field to which the primary parsing text belongs is "product efficacy", the weight of "dark yellow" is higher than the weight of "skin type", the "dark yellow skin type" is resolved into "dark yellow", and the final analyzed sentence is "mask {w=0.48} may improve dark yellow {w=0.80}". Then, according to "mask {w=0.48} may improve dark yellow {w=0.80}", the corresponding answer in the field of product efficacy is queried, and the assembled answer is returned.

The method provided by the above embodiment of the present disclosure improves the accuracy of the result of parsing semantics by determining the service field to which the primary parsing text belongs and parsing the primary parsing text in the subdivided service field to obtain the secondary parsing text.

Figure 4:
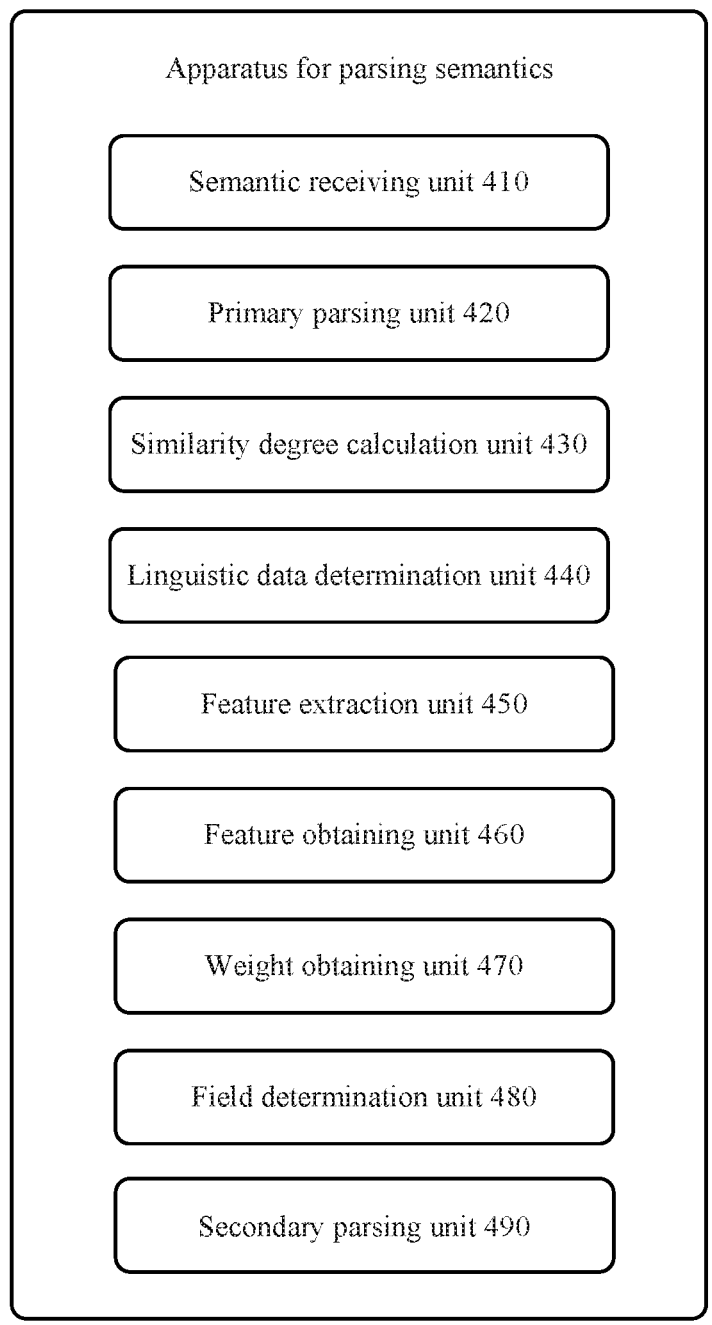
FIG. 4 is a schematic structural diagram of an embodiment of an apparatus for parsing semantics according to the present disclosure.

With further reference to FIG. 4, as an implementation to the method shown in the above figures, the present disclosure provides an embodiment of an apparatus for parsing semantics. The apparatus embodiment corresponds to the method embodiment shown in FIG. 2, and the apparatus may specifically be applied to various electronic devices.

As shown in FIG. 4, the apparatus 400 for parsing semantics of the present embodiment includes: a semantic receiving unit 410, a primary parsing unit 420, a similarity degree calculation unit 430, a linguistic data determination unit 440, a feature extraction unit 450, a feature obtaining unit 460, a weight obtaining unit 470, a field determination unit 480 and a secondary parsing unit 490.

Here, the semantic receiving unit 410 is configured to receive semantic information inputted by a user. The primary parsing unit 420 is configured to parse the semantic information to obtain a primary text feature of an associated service. The similarity degree calculation unit 430 is configured to calculate a similarity between the primary text feature and a linguistic data feature in a corpus. The linguistic data determination unit 440 is configured to use a linguistic data to which a linguistic data feature most similar to the primary text feature belongs, as a primary parsing text. The feature extraction unit 450 is configured to extract a feature of the primary parsing text to obtain a secondary text feature. The feature obtaining unit 460 is configured to obtain a service feature matching the secondary text feature in a service feature database and a service field to which the obtained service feature belongs. The weight obtaining unit 470 is configured to obtain a weight value associated with the obtained service feature in the service feature weight database. The field determination unit 480 is configured to use a service field to which a service feature having a greatest weight value belongs, as the service field to which the primary parsing text belongs. The secondary parsing unit 490 is configured to parse the primary parsing text in the service field to which the primary parsing text belongs, to obtain a secondary parsing text.

In some alternative implementations of the present embodiment, the apparatus for parsing semantics further includes (not shown in the figures): an answer querying unit, configured to query an answer corresponding to the secondary parsing text in an answer set corresponding to the service field to which the primary parsing text belongs; and an answer presentation unit, configured to present the answer corresponding to the secondary parsing text.

In some alternative implementations of the present embodiment, the primary parsing unit is further configured to: obtain text information of the semantic information; perform cleaning and dimensionality reduction on the text information; perform semantic and syntactic analysis on the cleaned and dimensionality-reduced text information to obtain a text information feature, and extract a feature of the associated service in the text information feature to obtain the primary text feature; and/or the feature extraction unit is further configured to: obtain the primary parsing text; perform cleaning and dimensionality reduction on the primary parsing text; and perform semantic and syntactic analysis on the cleaned and dimensionality-reduced primary parsing text to obtain the secondary text feature.

In some alternative implementations of the present embodiment, the feature obtaining unit is further configured to: obtain the service feature matching the secondary text feature in the service feature database; perform an anaphora resolution on the service feature matching the secondary text feature to obtain an anaphora-resolved service feature; and determine the anaphora-resolved service feature as the obtained service feature.

In some alternative implementations of the present embodiment, the apparatus for parsing semantics further includes (not shown in the figures): a sample obtaining unit, configured to obtain a sample of service information in a marked service field; a part of speech determination unit, configured to perform a word segmentation on the sample based on statistic and machine learning and determine parts of speech of the segmented words; and a feature determination unit, configured to determine the service feature in the service feature database and the service field to which the service feature belongs, according to a frequency of occurrence and the parts of speech of the segmented words.

In some alternative implementations of the present embodiment, the apparatus for parsing semantics further includes (not shown in the figures): a weight setting unit, configured to set a weight of the service feature in the service feature weight database, according to a granularity of the service feature and a preset corresponding relationship between the granularity and the weight.

It may be appreciated by those skilled in the art that the above apparatus 400 for parsing semantics also includes other well-known structures, such as processors and memories. In order not to unnecessarily obscure the embodiments of the present disclosure, these well-known structures are not shown in FIG. 4.

It should be understood that the units described in apparatus 400 correspond to the various steps in the method described with reference to FIG. 2. Thus, the operations and features described above for the method for parsing semantics are equally applicable to the apparatus 400 and the units contained therein, and detailed description thereof will be omitted. The corresponding units in the apparatus 400 may cooperate with units in the terminal device and/or the server to implement the solution of the embodiments of the present disclosure.

In the above embodiments of the present disclosure, the primary text feature and the secondary text feature only represent that the source data of the obtained text feature is not identical and the obtained text features are not identical, and the method for obtaining the text feature may be the same or different. Those skilled in the art will appreciate that the primary and the secondary do not constitute special limitations on the text features.

In the above embodiments of the present disclosure, the primary parsing text and the secondary parsing text only represent the source data of the parsing is not identical, the methods for the parsing are not identical, and the resulting parsing texts are not identical. Those skilled in the art will appreciate that the primary and the secondary do not constitute special limitations on the parsing texts.

Figure 5:
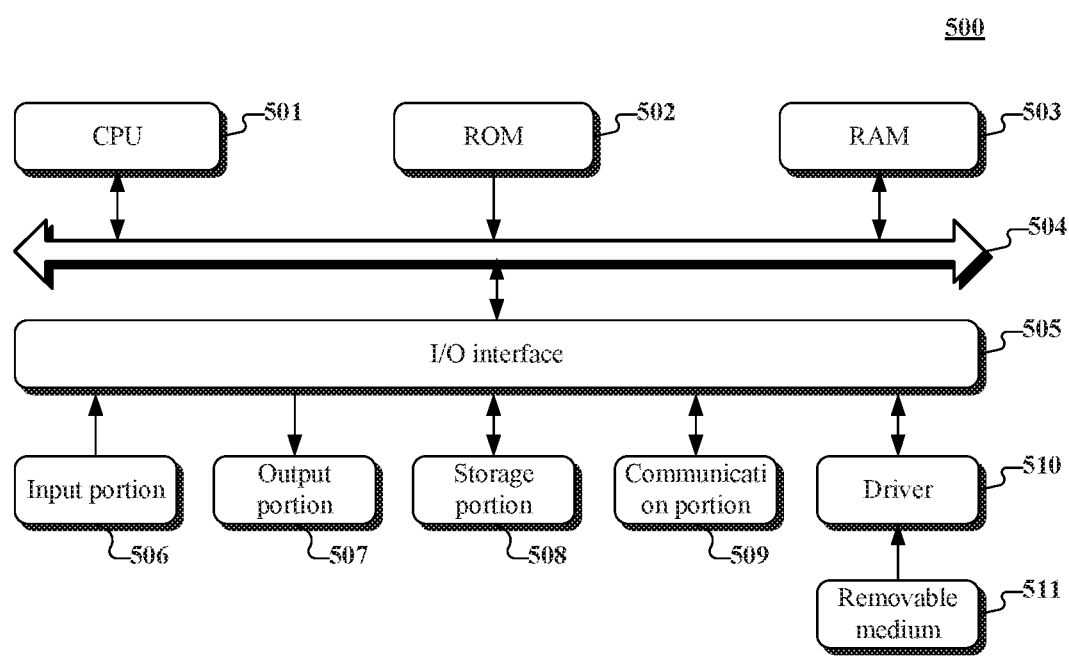
FIG. 5 is a schematic structural diagram of a computer system adapted to implement a terminal device or server of the embodiments of the present disclosure.

Referring to FIG. 5, a schematic structural diagram of a computer system 500 adapted to implement a terminal device or a server of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 including a cathode ray tube (CRT), a liquid crystal display device (LCD), a speaker etc.; a storage portion 508 including a hard disk and the like; and a communication portion 509 including a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a semantic receiving unit, a primary parsing unit, a similarity degree calculation unit, a linguistic data determination unit, a feature extraction unit, a feature obtaining unit, a weight obtaining unit, a field determination unit, and a secondary parsing unit, where the names of these units do not in some cases constitute a limitation to such units themselves. For example, the semantic receiving unit may also be described as "a unit for receiving semantic information inputted by a user.

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: receive semantic information inputted by a user; parse the semantic information to obtain a primary text feature of an associated service; calculate a similarity degree between the primary text feature and a linguistic data feature in a corpus; use a linguistic data to which a linguistic data feature most similar to the primary text feature belongs, as a primary parsing text; extract a feature of the primary parsing text to obtain a secondary text feature; obtain a service feature matching the secondary text feature in a service feature database and a service field to which the obtained service feature belongs; obtain a weight value associated with the obtained service feature in a service feature weight database; use a service field to which a service feature having a greatest weight value belongs, as a service field to which the primary parsing text belongs; and parse the primary parsing text in the service field to which the primary parsing text belongs, to obtain a secondary parsing text.

The above description only provides an explanation of the preferred embodiments of the present disclosure and the technical principles used. It should be appreciated by those skilled the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for parsing semantics, the method comprising:
    receiving semantic information inputted by a user;
    parsing the semantic information to obtain a primary text feature of an associated service;
    calculating a similarity degree between the primary text feature and a linguistic data feature in a corpus;
    using a linguistic data to which a linguistic data feature most similar to the primary text feature belongs, as a primary parsing text;
    extracting a feature of the primary parsing text to obtain a secondary text feature;
    obtaining a service feature matching the secondary text feature in a service feature database and a service field to which the obtained service feature belongs;
    obtaining a weight value associated with the obtained service feature in a service feature weight database;
    using a service field to which a service feature having a greatest weight value belongs, as a service field to which the primary parsing text belongs; and
    parsing the primary parsing text in the service field to which the primary parsing text belongs, to obtain a secondary parsing text, wherein the parsing the semantic information to obtain a primary text feature of an associated service comprises: obtaining text information of the semantic information; performing cleaning and dimensionality reduction on the text information; performing a semantic and syntactic analysis on the cleaned and dimensionality-reduced text information to obtain a text information feature, and extracting a feature of the associated service in the text information feature to obtain the primary text feature; and/or
    the extracting a feature of the primary parsing text to obtain a secondary text feature comprises: obtaining the primary parsing text performing cleaning and dimensionality reduction on the primary parsing text and performing a semantic and syntactic analysis on the cleaned and dimensionality-reduced primary parsing text to obtain the secondary text feature.

2. The method for parsing semantics according to claim 1, the method further comprising:
    querying an answer corresponding to the secondary parsing text in an answer set corresponding to the service field to which the primary parsing text belongs; and
    presenting the answer corresponding to the secondary parsing text.

3. The method for parsing semantics according to claim 1, wherein the obtaining a service feature matching the secondary text feature in a service feature database comprises:
    obtaining the service feature matching the secondary text feature in the service feature database;
    performing an anaphora resolution on the service feature matching the secondary text feature to obtain an anaphora-resolved service feature; and
    determining the anaphora-resolved service feature as the obtained service feature.

4. The method for parsing semantics according to claim 3, the method further comprising:
    obtaining a sample of service information in a marked service field;
    performing a word segmentation on the sample based on statistic and machine learning and determining a part of speech of a segmented word; and
    determining the service feature in the service feature database and the service field to which the service feature belongs, according to a frequency of occurrence and the part of speech of the segmented word.

5. The method for parsing semantics according to claim 4, the method further comprising:
    setting a weight of the service feature in the service feature weight database, according to a granularity of the service feature and a preset corresponding relationship between the granularity and the weight.

6. An apparatus for parsing semantics, the apparatus comprising:

a processor and a memory storing computer readable instructions, wherein the instructions, when executed, cause the processor to perform operations, the operations comprising:

receiving semantic information inputted by a user;

parsing the semantic information to obtain a primary text feature of an associated service;

calculating a similarity degree between the primary text feature and a linguistic data feature in a corpus;

using a linguistic data to which a linguistic data feature most similar to the primary text feature belongs, as a primary parsing text;

extracting a feature of the primary parsing text to obtain a secondary text feature;

obtaining a service feature matching the secondary text feature in a service feature database and a service field to which the obtained service feature belongs;

obtaining a weight value associated with the obtained service feature in a service feature weight database;

using a service field to which a service feature having a greatest weight value belongs, as a service field to which the primary parsing text belongs; and parsing the primary parsing text in the service field to which the primary parsing text belongs, to obtain a secondary parsing text, wherein the parsing the semantic information to obtain a primary text feature of an associated service comprises: obtaining text information of the semantic information; performing cleaning and dimensionality reduction on the text information; performing a semantic and syntactic analysis on the cleaned and dimensionality-reduced text information to obtain a text information feature, and extracting a feature of the associated service in the text information feature to obtain the primary text feature; and/or the extracting a feature of the primary parsing text to obtain a secondary text feature comprises: obtaining the primary parsing text performing cleaning and dimensionality reduction on the primary parsing text and performing a semantic and syntactic analysis on the cleaned and dimensionality-reduced primary parsing text to obtain the secondary text feature.

7. The apparatus for parsing semantics according to claim 6, the operations further comprising:

querying an answer corresponding to the secondary parsing text in an answer set corresponding to the service field to which the primary parsing text belongs; and presenting the answer corresponding to the secondary parsing text.

8. The apparatus for parsing semantics according to claim 6, wherein the obtaining a service feature matching the secondary text feature in a service feature database comprises obtaining the service feature matching the secondary text feature in the service feature database; performing an anaphora resolution on the service feature matching the secondary text feature to obtain an anaphora-resolved service feature; and determining the anaphora-resolved service feature as the obtained service feature.

9. The apparatus for parsing semantics according to claim 8, the operations further comprising:

obtaining a sample of service information in a marked service field;

performing a word segmentation on the sample based on statistic and machine learning and determining a part of speech of a segmented word; and determining the service feature in the service feature database and the service field to which the service feature belongs, according to a frequency of occurrence and the part of speech of the segmented word.

10. The apparatus for parsing semantics according to claim 9, the operations further comprising:

setting a weight of the service feature in the service feature weight database, according to a granularity of the service feature and a preset corresponding relationship between the granularity and the weight.

11. A non-volatile computer storage medium, storing computer readable instructions executable by a processor, wherein when executed, the computer readable instructions cause the processor to perform operations, the operations comprising:

receiving semantic information inputted by a user;

parsing the semantic information to obtain a primary text feature of an associated service;

calculating a similarity degree between the primary text feature and a linguistic data feature in a corpus;

using a linguistic data to which a linguistic data feature most similar to the primary text feature belongs, as a primary parsing text;

extracting a feature of the primary parsing text to obtain a secondary text feature;

obtaining a service feature matching the secondary text feature in a service feature database and a service field to which the obtained service feature belongs;

obtaining a weight value associated with the obtained service feature in a service feature weight database;

using a service field to which a service feature having a greatest weight value belongs, as a service field to which the primary parsing text belongs; and parsing the primary parsing text in the service field to which the primary parsing text belongs, to obtain a secondary parsing text, wherein the parsing the semantic information to obtain a primary text feature of an associated service comprises: obtaining text information of the semantic information; performing cleaning and dimensionality reduction on the text information; performing a semantic and syntactic analysis on the cleaned and dimensionality-reduced text information to obtain a text information feature, and extracting a feature of the associated service in the text information feature to obtain the primary text feature; and/or the extracting a feature of the primary parsing text to obtain a secondary text feature comprises: obtaining the primary parsing text performing cleaning and dimensionality reduction on the primary parsing text and performing a semantic and syntactic analysis on the cleaned and dimensionality-reduced primary parsing text to obtain the secondary text feature.

\* \* \* \* \*